UNITED STATES PATENT OFFICE.

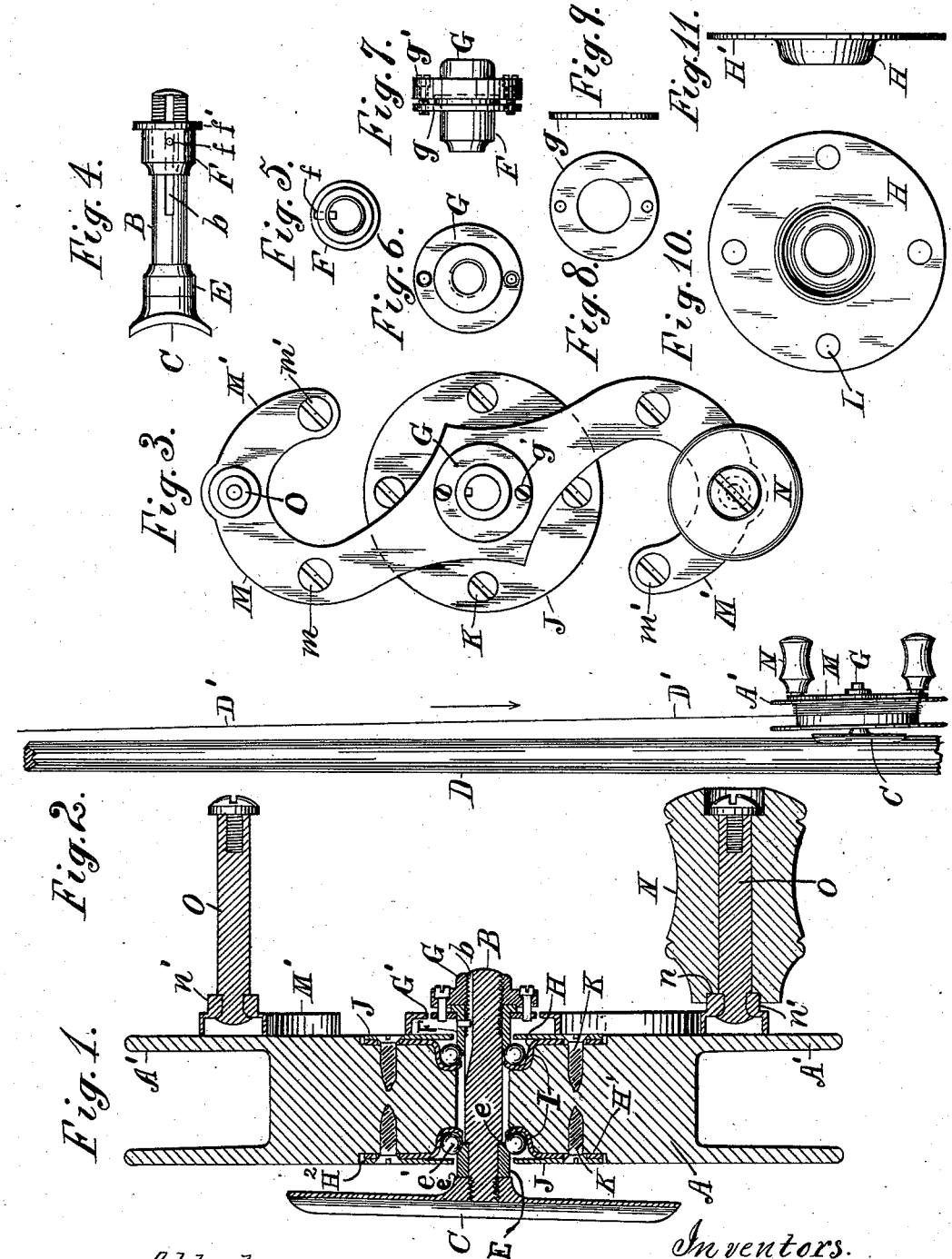

AUGUST F. MEISSELBACH AND WILLIAM MEISSELBACH, OF NEWARK, NEW JERSEY.

BALL-BEARING FISHING-REEL.

SPECIFICATION forming part of Letters Patent No. 578,608, dated March 9, 1897.

Application filed November 14, 1896. Serial No. 612,097. (No model.)

*To all whom it may concern:*

Be it known that we, AUGUST F. MEISSELBACH and WILLIAM MEISSELBACH, citizens of the United States, residing at Newark, county of Essex, State of New Jersey, have invented certain new and useful Improvements in Fish-Reels with Ball-Bearings, fully described and represented in the following specification and the accompanying drawings, forming a part of the same.

The present invention relates to a means for applying ball-bearings to the opposite sides of the wooden spool which is employed for large fish-reels; and the invention consists particularly of means for applying the ball-races independently to the opposite sides of the spool, so that either of the races may be readily removed and renewed when worn.

The invention also consists partly in the construction for the reel-stud, in the means for adjusting the movable cone, in the construction for the foot-piece which supports the reel-stud upon the fish-pole, and partly in the construction of the crank-plate upon the reel.

The invention will be understood by reference to the annexed drawings, in which—

Figure 1 is a section through the reel and its attachments at the center line. Fig. 2 is an edge view of the reel and part of the pole to which it is attached. Fig. 3 shows the crank-plate and cover for one of the ball-bearings. Fig. 4 is an end view of the foot-piece carrying the reel-stud with the movable cone thereon, and Fig. 5 is an end view of the movable cone. Fig. 6 shows the outer side of the adjusting-nut. Fig. 7 is an edge view of the movable cone and its adjusting-nut. Fig. 8 is a face view, and Fig. 9 an end view, of the collar for the adjusting-nut. Fig. 10 is a face view, and Fig. 11 an edge view, of one of the ball-races.

A designates the spool or reel-body, B the stud, upon which it rotates, and C the foot-piece, by which the stud is fastened to the pole D in the usual manner. The stud in such constructions is commonly placed at right angles to the axis of the pole; but in the present invention the stud is set at such an angle to the foot-piece that when clamped upon the pole the reel may incline toward the outer end of the pole and the line thus run centrally upon the reel instead of winding wholly upon one side of the same. Such adjustment of the reel and line is clearly shown in Fig. 2, the line running naturally to the middle point between the flanges A' of the reel and thus winding as freely upon one side as upon the other. The reel-stud is shown provided with a fixed cone E and a movable cone F, the latter being held adjustably by a nut G. The reel is bored to clear the stud, and the opposite sides of the reel are formed each with concentric socket I, adapted to fit the boss H of a sheet-metal ball-race which is stamped with a flat flange H'.

The sides of the reel are suitably recessed to admit such flanges and flat covers J, adapted to inclose the balls within the races. The covers are formed with countersunk holes to fit wood-screws K, and the ball-races are formed with clearance-holes L, through which such screws are inserted into the body of the reel, as shown in Fig. 1. The sockets I are made exactly concentric with one another and with the periphery of the wheel and serve to center the ball-races accurately at the opposite sides of the reel, and the formation of the ball-races with clearance-holes L prevents the screws K from deranging the adjustment of the races in the center of the reel when the covers J are secured in place. The balls are crowded into the bottoms of their respective races by the cones E and F and thus held at a slight angle with the foot-plate C, as is shown in Fig. 1.

The fixed cone E is made detachable from the stud B and secured thereon by shoulder *e*, which forces the cone against the foot-piece when the stud is screwed into the latter, as shown in Fig. 1. By this construction the cone may be made of much higher grade of steel than the stud and may be hardened without hardening the stud, which thus preserves the toughness of the latter.

The cone F is provided with a pin or key *f*, fitted to a groove *b* in the stud, as shown in Fig. 1, and the cone is united to the nut G by an adjustable friction-clutch, which permits the rotation of the nut to adjust the cone, but prevents the accidental displacement of the nut and cone when the reel is in use. A mere swivel-joint connecting the nut and cone would permit the turning of the nut to adjust the cone, but would not in any manner protect the nut from accidental rotation when the reel is in use. The reel is shown provided with a double crank-plate M, upon which two handles N are pivoted by crank-pins O and formed with aperture G' at the center to clear the adjusting-nut G. When the operator is turning the reel by such handles, his hand or his coat-sleeve is liable to brush against the adjusting-nut G and to thus rotate the same and derange the adjustment of the cone F. If the cone be slackened, the reel is not properly supported upon its bearing, and if the cone be tightened the rotation of the reel is checked and the strain upon the fish-line is improperly increased.

In our construction we form the adjustable cone with a flange $f'$, which we clamp to the inner side of the adjusting-nut by an adjustable collar $g$, which is slipped over the body of the cone and pressed against its inner side by adjusting-screws $g'$. This construction forms a friction union or clutch between the cone and nut, by which the resistance to the rotation of the nut may be so adjusted that it can be turned forcibly when the adjustment of the cone is required, but is held thereafter securely from accidental displacement.

The screws $g'$, which clamp the clutch-collar $g$, may also be tightened after the cone F is properly adjusted, which completely prevents the rotation of the nut, as the cone is held from rotation by the pin $f$. In the crank-plates commonly applied to such wooden reel-bodies the crank-pin is attached to the extreme end of the crank-arm, and the nearest point of attachment between such crank-pin and the wooden reel is at the adjacent screw, which is lettered $m$ in Fig. 3. It is necessary in such reels to reduce the weight as much as possible, and the crank-arm is commonly made very light and is thus liable to be bent where perforated by the screw $m$ if the adjacent handle M be accidentally struck, which thus throws the handle into an unnatural and inconvenient position. To prevent such bending of the crank-plate by an accidental blow upon the handle, we form the plate beyond the center of the crank-pin with an extension M', which is curved inwardly toward the reel-stud B, so as to avoid the projection of the same beyond the line of the handle. A screw $m'$ is inserted through such extension of the crank-plate into the reel, and the crank-pin is thus supported by screws upon both sides and held with greater firmness and its accidental bending prevented.

To secure lightness and strength in the crank-plate, we form it of hollow box-section, as shown in Fig. 1. The inner end of the handle in such reels is commonly fitted to a shoulder upon the crank-pin, and the fish-line is liable to be caught between such handle and the shoulder. To prevent such accident, we provide in our construction a counterbore $n$ in the inner end of the handle, which we fit over a boss $n'$ upon the crank-plate, and thus cover the shoulder and prevent the accidental intrusion of the fish-line if the same falls upon the handle.

When the ball-races are made in the opposite ends of a solid bushing, they cannot be separately removed and renewed, and the construction of such a bushing is far more expensive than the sheet-metal races shown, which may be stamped of sheet-steel at the lowest possible cost, and can be removed separately and renewed whenever required.

The inner edge of the ball-race is turned toward the balls, and the covers J, which hold the ball-races to the body of the reel, are fitted in practice close enough to the balls to hold them in the races when the stud B is removed. With this construction the operator is enabled whenever the line becomes fouled with the stud between the spool and the foot-plate C to remove the nut G and take the reel off of the stud to clear the line without losing any of the balls from the race. This feature is common to such constructions and is particulary mentioned herein because the covers J are, to separate the parts distinctly upon the drawings, shown a little farther from the balls than is necessary in practice.

The sides of the reel are recessed at $H^2$ in Fig. 1 a little larger than the ball-race flanges H', so that the ball-race is centered within the spool wholly by the contact of the boss H with the socket I. If the holes L in the ball-race flanges were made to fit the screws K, the ball-race would be liable to displacement when inserting the screws in the reel, as the wood-screws cannot be inserted accurately.

By making the recesses larger than the flanges and the holes L larger than the screws we prevent the derangement of the ball-races when securing the parts together.

Having thus set forth the nature of our invention, what is claimed herein is—

1. In a fish-reel, the combination, with the stud having cones and suitable balls, of a body having the concentric sockets I formed in its opposite sides, ball-races formed with hubs H adapted to fit such sockets and provided with flanges H', and the sides of the body having recesses slightly larger than such flanges, to receive the same without centering them, so that the hubs may be centered exclusively by the sockets, substantially as herein set forth.

2. In a fish-reel, the combination, with a stud having cones and suitable balls, of a body having the concentric sockets I formed in its opposite sides, and the ball-races formed of sheet metal with the hubs H, flanges H' provided with clearance-holes, and the covers J unprovided with any centering devices and secured over such flanges by the screws K inserted through said clearance-holes, so as to clamp the flange without displacing the same laterally, substantially as shown and described.

3. The combination, with a fish-reel body having ball-bearings in opposite sides, of the stud B provided with shoulder e, the cone E fitted against such shoulder and the foot-piece G secured upon the stud against such cone, and an adjustable cone to hold the reel in place, as and for the purpose set forth.

4. The combination, with a fish-reel body having ball-bearings in opposite sides, of the stud B having a fixed cone at its base, the adjusting-cone F with means to hold it from turning upon the stud, and an adjusting-nut connected with the adjustable cone by a friction-clutch, as and for the purpose set forth.

5. The combination, with a fish-reel body having ball-bearings in opposite sides, of the stud B having a fixed cone at its base, the adjusting-cone F with means to hold it from turning upon the stud, and provided with the flange $f'$ and the nut G and collar $g$ pressed together upon the flange $f'$ by screws $g'$, as and for the purpose set forth.

6. The combination, with a wooden fish-reel body, of the crank-plate M having crank-pin O and provided with the extension M' curved inwardly toward the center of the reel, and the screws $m$, $m'$ for securing the plate and its extension to the reel-body adjacent to the crank-pin, as and for the purpose set forth.

In testimony whereof we have hereunto set our hands in the presence of two subscribing witnesses.

AUGUST F. MEISSELBACH.
WILLIAM MEISSELBACH.

Witnesses:
THOMAS S. CRANE,
GEORGE FLOTTMAN.